Figure 1:
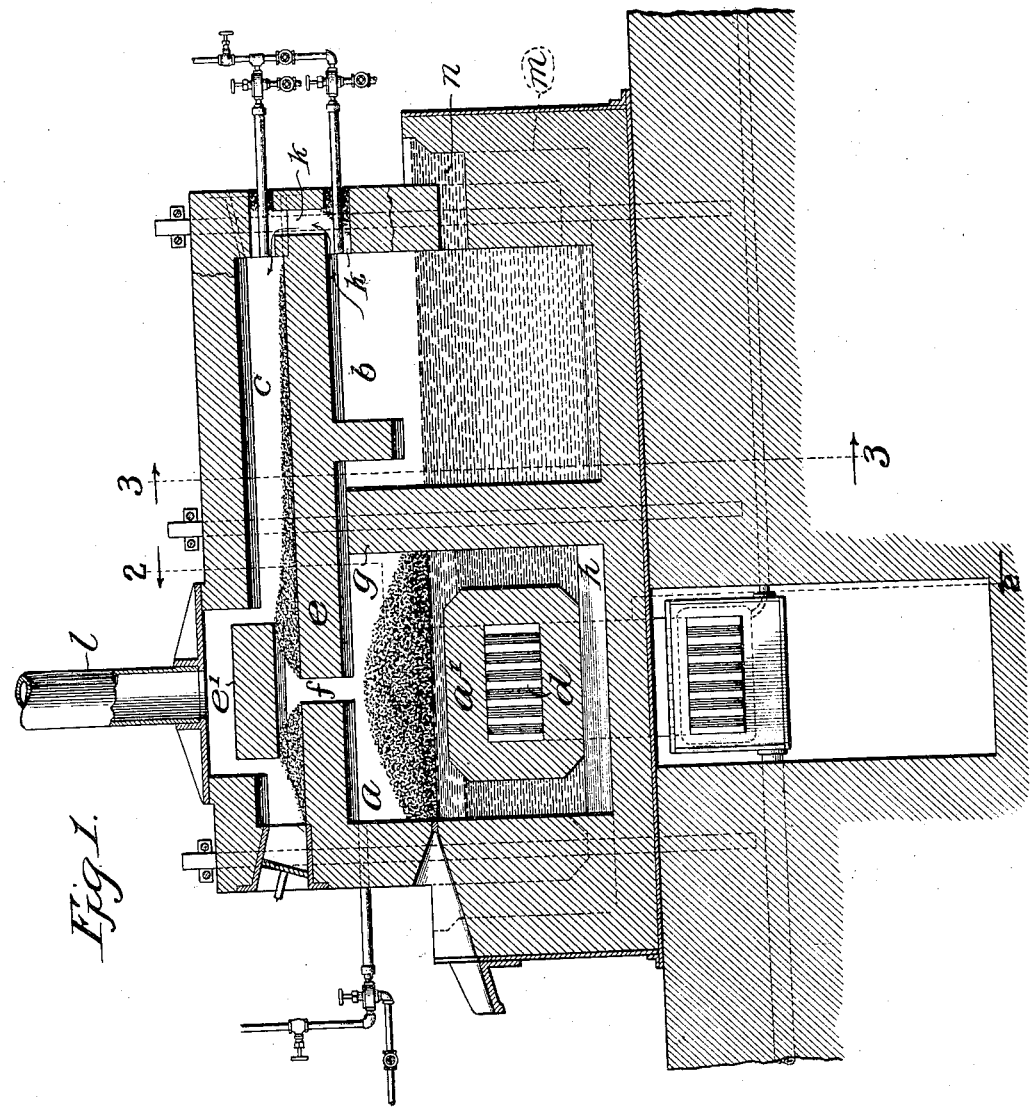

No. 859,134. PATENTED JULY 2, 1907.
F. T. SNYDER.
SMELTING PROCESS.
APPLICATION FILED JUNE 25, 1906.

2 SHEETS—SHEET 1.

Witnesses:

Inventor:
Frederick T. Snyder,
By Burton Jenner & Folk
Attys.

No. 859,134.

PATENTED JULY 2, 1907.

F. T. SNYDER.
SMELTING PROCESS.
APPLICATION FILED JUNE 25, 1906.

2 SHEETS—SHEET 2.

Witnesses:
Geo. C. Dawson
Irving MacDonald

Inventor:
Frederick T. Snyder,
By Barton, Tanner & Back
Attys.

UNITED STATES PATENT OFFICE.

FREDERICK T. SNYDER, OF OAK PARK, ILLINOIS, ASSIGNOR TO ELECTRIC METALS COMPANY, OF CHICAGO, ILLINOIS, A CORPORATION OF WEST VIRGINIA.

SMELTING PROCESS.

No. 859,134.　　　Specification of Letters Patent.　　　Patented July 2, 1907.

Application filed June 25, 1906. Serial No. 323,211.

*To all whom it may concern:*

Be it known that I, FREDERICK T. SNYDER, a citizen of the United States, residing at Oak Park, in the county of Cook and State of Illinois, have invented a certain new and useful Improvement in Smelting Processes, of which the following is a full, clear, concise, and exact description.

My invention relates to a smelting process for the treatment of ores of metals which are volatile at reduction, such as zinc, the object being to produce the metallic vapor under such conditions that it will not be diluted by such quantities of other gaseous products of reduction as would interfere with proper condensation of the metal in coherent form.

In my previous application, Serial No. 266,541, filed June 23rd, 1905, I have described a process in which the ore before being introduced into the smelting chamber is given a preliminary partial reduction by heating it with carbon and fluxes to drive off the non-metallic gaseous constituents as completely as possible, the smelting furnace being fed with such partially reduced ore instead of raw material.

In accordance with my present invention, the ore is smelted with carbon and fluxes in successive isolated charges, each charge being separately heated from the bottom upward, in stages, first to a temperature sufficient to reduce the ore and drive off the non-metallic gaseous constituents which are allowed to escape through the body of the charge, the upper portion of the charge during this stage of the heating being sufficiently cool to condense therein the metallic vapor liberated during this stage; then after the non-metallic vapors have largely escaped, the heating is continued and the greater part of the metal vaporized, the residues are the fused to form a slag, and finally this slag is boiled to expel substantially all volatile metal before fresh material is added. The metallic vapors, therefore, coming from the furnace mostly during the last stages of the process are not seriously diluted and may be condensed in coherent form. The present process is thus essentially an intermittent one, so far as the recovery of metal is concerned, each furnace charge being put in at a low temperature, heated gradually, then completely melted down and fused before the next charge is introduced into the furnace.

In the accompanying drawings I have illustrated one form of furnace by which the process of this invention may be carried out.

Figure 3:
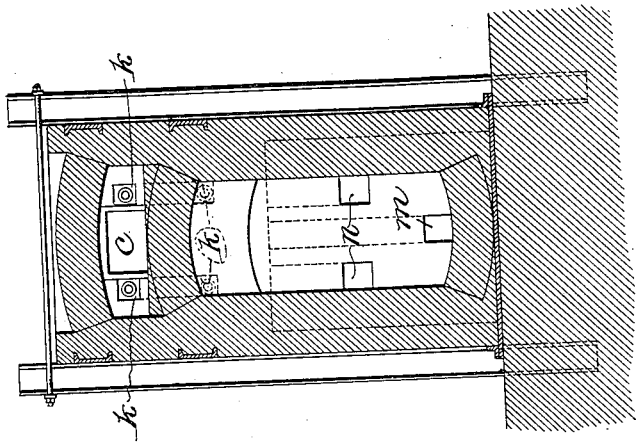
Figure 2:
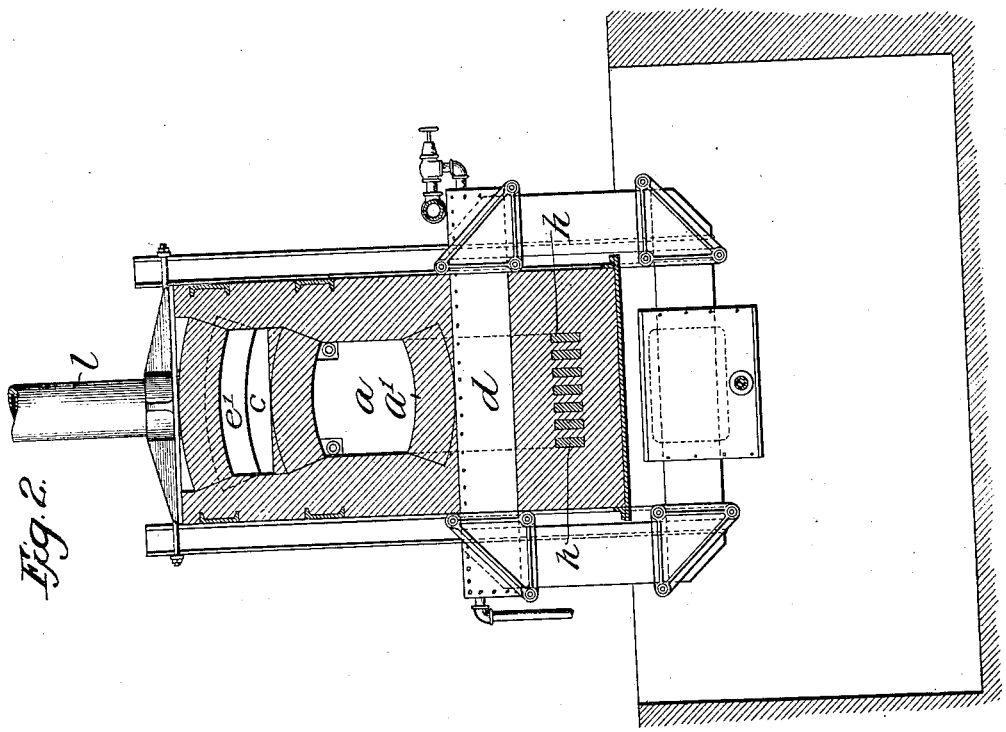

Figure 1 is a longitudinal sectional elevation of the furnace; Fig. 2 is a view in cross-section on line 2—2 of Fig. 1; and Fig. 3 is a view in cross-section on line 3—3 of Fig. 1.

The same letters of reference are used to designate the same parts wherever they are shown.

The apparatus shown consists of a smelting chamber $a$, or furnace proper, a condenser $b$, for liquid metal, alongside the smelting chamber, and a pre-heating chamber $c$ which is not essential to the practice of the present invention but which may conveniently be employed to complete the roasting of the ore and to bring it to a temperature where it is ready for smelting before entering the furnace, thus saving the more costly electrical heat. The smelting furnace is heated by the passage of an electric current through a bath of molten slag contained in the furnace, said slag serving as a bed to receive the charge, which is thus heated from the bottom upward. The furnace illustrated is of the "induction" type; that is, the chamber is arranged to hold the molten material in the form of a closed secondary circuit around the core $d$, the upper arm of which is embedded in a bridge $a'$ extending across the furnace chamber, the lower end of said core being provided with a primary coil exterior to the furnace, connected with a suitable source of alternating current. The core $d$ is preferably divided longitudinally by troughs, through which a flow of water is maintained; similar troughs being also provided upon the outer sides of the core. The reverberatory roof $e$ covering the furnace chamber and the adjoining zinc condenser may form the floor of the pre-heating chamber $c$, and is provided with an opening $f$ through which the material from the heating chamber may be introduced into the furnace. This opening should normally be closed to prevent the escape of gas from the furnace, or access of air thereto, and for this purpose a secondary roof $e'$ is provided immediately over the opening $f$, and the materials in the chamber $c$ are so heaped up around the edge of said opening that they reach up to the roof $e'$ and form a seal. In smelting lead-zinc ore, the furnace chamber will contain molten lead in the two wells formed on either side of the central partition $g$ in which the core is embedded, matte above the lead and slag above the matte, the slag extending across the top of the bridge and electrically uniting the material in the two side wells.

An opening $i$ is provided through the partition wall between the furnace and the condensing chamber, to conduct away the gaseous products of smelting; and from the condensing chamber flues $k$ $k$ lead up to the pre-heating chamber $c$, where the uncondensed gases may be burned, the waste products finally passing off through the stack $l$. Oil burners are shown for initially heating the various chambers, or for supplying additional heat when required. During the smelting operation, however, the burners applied to chamber $a$ and $b$ are shut off and the openings plugged up with clay. Air is admitted to the heating chamber in order to burn the gases brought by flues $k\ k$ from the lower portion of the furnace. The zinc condenser serves also as a refining chamber, in which any lead which may have been vaporized and carried over with the zinc may settle out. A well $m$ is shown for withdrawing molten lead from the bottom of the condenser, and two zinc wells $n\ n$ are also shown, for taking off the zinc at points nearer the top of the body of liquid, from which the lead will have settled out.

The operation of the furnace above described in carrying out the process of this invention is as follows: The furnace charge, made up of the ore to be smelted, mixed with carbon and fluxes adapted to form a slag with the residues of said charge, is introduced into the chamber $\bar{c}$ through suitable doors therein, and passed through the opening $f$ into the smelting chamber, said openings then being sealed by heaping up additional material around the edges thereof up to the secondary roof $e'$ as previously described. The charge is now smelted in the absence of air, going through four stages of heating, the heat being applied at the bottom of the body of the charge and gradually spreading upward, the portions nearest the slag being melted down first. During the first stage in the operation, carbon monoxid is given off in considerable quantities, with some zinc, but the upper portion of the charge is sufficiently cool at this time so that most of the zinc vapor liberated during this stage is condensed in or on the charge in the form of dust, which remains in the furnace chamber. Then after most of the non-condensable gases, such as CO, have been driven off, the second stage takes place, in which the zinc vapor is given off freely, this vapor not being accompanied with such quantities of other gases as to prevent condensation in liquid form, such condensation taking place in the chamber $b$. The third stage is that in which the residues are fused to form slag and matte, and the fourth stage is that in which the fused charge is subjected to the maximum heat, the slag being superheated to expel substantially all the volatile metal. In accordance with this invention each separate charge of material is subjected to all the four stages of treatment above described before a fresh charge is admitted to the furnace, in order to prevent the metallic vapor given off during the three last stages from being diluted by the gaseous products of the first stage of a fresh charge. By adopting this intermittent treatment of the ore in successive isolated charges, I am enabled to produce coherent zinc as a direct product of the operation, instead of zinc dust, which requires to be re-smelted in order to produce spelter.

A further especial advantage of this process over a process in which fresh charges are added in the furnace before a former charge is entirely fused, and where the zinc vapor is continuously taken off, is that I am enabled finally to superheat the slag above its melting point, to drive off all the zinc therefrom, while in the continuous process such superheating is impossible because the application of additional heat merely serves to melt down additional material and form more slag, without raising the temperature as long as any supply of slag-forming material remains.

This process will be especially adapted to the treatment of ores containing both lead and zinc, for the recovery of both metals in a single smelting operation. Where lead is present in the ore it will be reduced during the earlier stages of the operation, and will sink through the slag and add to the molten metal in the bottom of the furnace chamber, from which it may be withdrawn from time to time as desired.

In another application, Serial No. 321,159, filed June 11, 1906, I have disclosed a process in which the separate stages occur at different places in a body of ore which is being progressively advanced toward a source of heat, the non-condensable gases being continuously taken off at one place which is maintained below the vaporization temperature of the volatile metal, while said volatile metal is at the same time continuously removed at another place subsequently reached in the advance of the material. I also wish to refer to my applications, Serial No. 327,635, filed July 25, 1906, Serial No. 321,159, filed June 11, 1906, and Serial No. 322,140, filed June 18, 1906.

While I have described my invention as applied particularly to treatment of zinc ore, and as carried out by a particular form of furnace, it is apparent that the process herein disclosed may be employed in treating the ores of other metals which are volatile at reduction, and any desired form of furnace may be used which will be suited to the requirements of any particular case.

I do not wish to be understood as claiming herein the generic invention defined by the claims of my application, Serial No. 321,159, above referred to, but expressly limit my claims herein to a specific modification, namely, the intermittent process in which the reduction of each volatile charge is substantially completed before a succeeding charge is added.

I therefore claim:

1. The process of treating ores of metals which are volatile at reduction, which consists in separately smelting successive isolated charges of such ore with reducing material and fluxes, heating a portion of each charge first to a temperature sufficient to drive off most of the gaseous compounds of the reducing agent, while maintaining a free surface of the charge sufficiently cool to condense the metallic vapor within the body of said charge, then further heating said charge as a whole to a degree sufficient to drive off substantially all of said volatile metal, fusing the residues to form a slag and superheating the slag, while collecting the vaporized metal.

2. The process of treating ores of metals which are volatile at reduction, which consists in smelting successive separate charges of such ore, with carbon and fluxes, upon a slag bath in a closed furnace, heating said furnace by the passage of an electric current through said slag, thereby heating each charge from the slag upward first to a degree sufficient to drive off most of the carbonic gases, while maintaining the upper surface of the charge sufficiently cool to condense the metallic vapor within the body of the charge, then fusing the charge as a whole to release the condensed metal therein and convert the residue into slag, and repeating the process with each succeeding charge.

3. The process of treating material containing a compound of a metal volatile at reduction, which consists in mixing said material with a reducing agent, electrically developing a temperature of reduction within a body of such mixture constituting a furnace charge, removing the non-metallic gaseous products through a free surface of the charge while condensing the metallic gaseous products within the body of the charge by maintaining said free surface below the vaporization temperature of the metal, then fusing the charge as a whole and heating the resulting molten residue to liberate the volatile metal at a period of time subsequent to the removal of most of the non-metallic gases, and condensing said liberated metal in coherent liquid form.

In witness whereof, I, hereunto subscribe my name this 23rd day of June A. D., 1906.

FREDERICK T. SNYDER.

Witnesses:
D. C. TANNER,
W. W. LEACH.